United States Patent [19]
Dey

[11] Patent Number: 5,964,882
[45] Date of Patent: *Oct. 12, 1999

[54] MULTIPLE TIMER ARCHITECTURE WITH PIPELINING

[75] Inventor: Shankar Dey, San Jose, Calif.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/745,604

[22] Filed: Nov. 8, 1996

[51] Int. Cl.⁶ .......................................................... G06F 1/04
[52] U.S. Cl. .............................................................. 713/502
[58] Field of Search ..................................... 395/557, 376, 395/381, 384; 713/502; 712/200, 205, 208

[56] References Cited

U.S. PATENT DOCUMENTS

| | | | |
|---|---|---|---|
| 4,214,173 | 7/1980 | Popper | 307/224 C |
| 4,741,004 | 4/1988 | Kane | 377/110 |
| 4,845,728 | 7/1989 | Truong et al. | 377/123 |
| 5,659,720 | 8/1997 | Fiacco et al. | 395/557 |
| 5,664,167 | 9/1997 | Pickett et al. | 395/557 |

OTHER PUBLICATIONS

Hwang et al., Computer Architecture And Parallel Processing, 1984, pp. 145–151.

Primary Examiner—Dennis M. Butler
Attorney, Agent, or Firm—H. Donald Nelson

[57] ABSTRACT

A timer counter with multiple timers in a pipelined architecture in which the multiple timers are serviced in the pipeline. The timer counter includes a control unit having a first control section and a second control section for sequencing the servicing of each of the multiple timers in a pipeline. The first and second control sections provide a pipeline sequence of the total required service of the timer counter. The pipeline architecture allows the multiple timers to be serviced in a pipeline without increasing the overall number of clocks.

5 Claims, 6 Drawing Sheets

MULTIPLE TIMER ARCHITECTURE WITH PIPELINING

BACKGROUND OF THE INVENTION

1. Field of the Invention

This invention relates generally to a timer counter unit utilized in computer systems and, more particularly, to a method of pipelining the servicing of the multiple timers in the timer counter unit.

2. Discussion of the Related Art

The timer counter unit in a computer system can serve various functions. Some of these functions include being used as a real-time clock, a square-wave generator and a digital one-shot. These and other functions can be implemented in a system design. For example, a real-time clock can be used to provide a system clock tick for peripheral devices.

Referring to FIG. 1 there is shown a timer counter unit 100 which is composed of three independent timers, timer 0 and associated timer 0 registers 102, timer 1 and associated timer 1 registers 104, and timer 2 and associated timer 2 registers 106, (the associated registers will be discussed later) CPU 108, and a counter element 110. The timer counter unit can thus be modeled as a single counter element, time multiplexed to three register banks. Each timer operates independently of the CPU 108. The individual timers in the timer counter unit 100 are serviced over 4 clock periods, one timer during each clock with an idle clock at the end of the servicing period (see FIG. 4). The step of servicing a timer consists of two functions; (1) processing the control bits of the timer's associated control register to determine the necessary actions and (2) implementing the necessary actions of incrementing the count element and making comparisons with the timer's associated maxcount register values. The prior art systems execute both of the two functions in the same clock period. However, as CPU clocks have been required to be faster and faster, the time for servicing the timer has become concomitantly smaller and smaller. To provide a solution to the required faster CPU clocks, it would require the present timer architecture to either use more clocks to service the timer counter or to speed up the counting block. However, these solutions are deleterious to the performance of the timer counter unit and the computer system and require the system designer to reserve more chip space for the timer counter unit.

One method to avoid the problems associated with the above two solutions is to develop a pipelining architecture for the timer control logic. The pipelining of the timer control logic would provide that the two functions of the timer service are done in a pipeline method, each of the functions utilizing a clock, one after the other. Since this would be done in a pipeline, the total number of clocks to service the three timers would still be the same as the prior art devices. Because the total timer service would be split into two functions, the time required for each function would be less, therefore each function would be accomplished in a faster CPU clock. This would provide that the timer counter logic does not have to speed up. The pipelining architecture would provide that the three timers share the same control logic and counting block. In the prior art, in each timer service clock the control register bits of that timer are loaded into the control logic and are then processed to determine if any service is required for that timer. The service is then executed in the remaining part of that same clock.

What is needed is a pipelining architecture that would have the first part of the servicing routine done in one clock and the second part of the servicing routine done in the following clock in which each servicing routine takes less per clock time than both functions of the control service per timer in the prior art.

SUMMARY OF THE INVENTION

The present invention is directed to a timer counter having multiple timers and a pipeline architecture in which the multiple timers are serviced in the pipeline. The timer counter includes a control unit having a first control section and a second control section for sequencing the servicing of each of the multiple timers in a pipeline.

The present invention is directed to a timer counter and includes a comparator, a counter element, and a count register associated with each of the multiple timers.

The present invention is further directed to a method of servicing multiple timers in a timer counter unit in a computer system. The servicing sequence is divided into a first sequence and a second sequence and the multiple timers are serviced in a pipeline sequence by the first servicing sequence and sequentially by the second servicing sequence.

The present invention is better understood upon consideration of the detailed description below, in conjunction with the accompanying drawings. As will become readily apparent to those skilled in this art from the following description there is shown and described an embodiment of this invention simply by way of illustration of the best mode to carry out the invention. As will be realized, the invention is capable of other embodiments and its several details are capable of modifications in various obvious aspects, all without departing from the scope of the invention. Accordingly, the drawings and detailed description will be regarded as illustrative in nature and not as restrictive.

BRIEF DESCRIPTION OF THE DRAWINGS

The accompanying drawings incorporated in and forming a part of the specification, illustrate the present invention, and together with the detailed description below serve to explain the principles of the invention. In the drawings.

DETAILED DESCRIPTION

Figure 1:
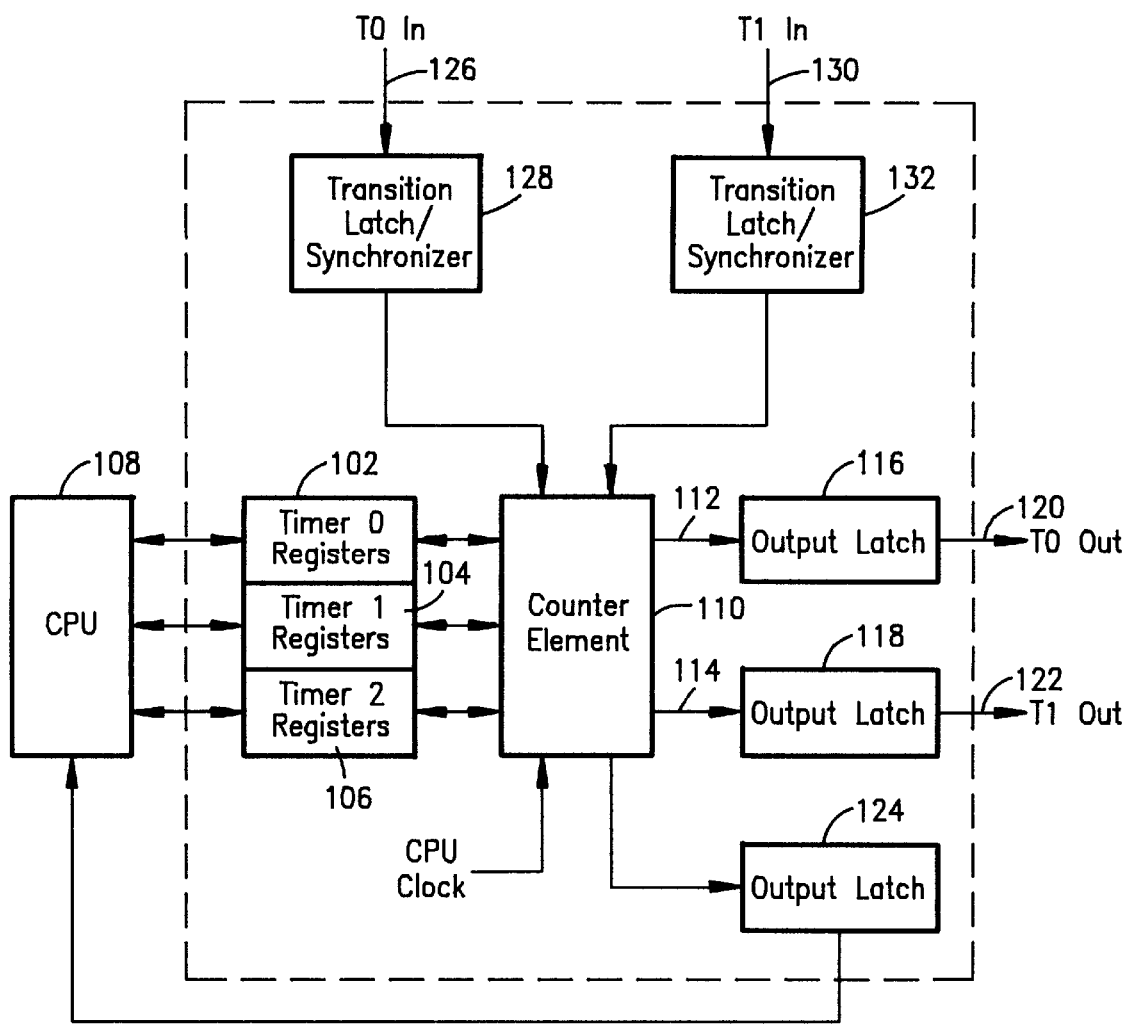
FIG. 1 shows the overall architecture of a timer counter.

In the following description, for purposes of clarity and conciseness of the description, not all of the numerous components shown in the schematics are described in detail. The numerous components are shown in the drawings to provide a person of ordinary skill in the art a thorough enabling disclosure of the present invention. It will be apparent to one skilled in the art that a detailed description of all of the specific components is not required in order for one of ordinary skill in the art to practice the present invention. Therefore, only those components that are affected by the present invention or that are necessary for an understanding of the present invention will be discussed. In addition, well known logic structures are also shown in block diagram form in order to not obscure the present invention unnecessarily.

Reference is now made in detail to a specific embodiment of the present invention, which illustrates the best mode presently contemplated by the inventor for practicing the invention.

Referring now to FIG. 1, there is illustrated a functional overview of the timer counter 100. The timer counter 100 is composed of three independent timers, timer 0 and associated timer 0 registers, at 102, timer 1 and associated timer 1 registers, at 104, and timer 2 and associated timer 2 registers, at 106. All three timers that make up the timer counter 100 are serviced over four clock periods, one timer serviced during each of the first three clocks with an idle clock at the end (see FIG. 4). Operation of the timers 102, 104, and 106 and bus interface operation are non interfering. The timers and associated timer registers, 102, 104, and 106 are dual ported between the counter element 110 and the CPU 108. Each of the timers 102, 104, and 106 keeps its own running count and has a user-defined maximum count value. The timer 0 102 and the timer 1 104 can use one maximum count value in the single maximum count mode or two alternating maximum count values in the dual maximum count mode. The timer 2 106 can only use one maximum count value. A control register (one of the associated registers to be discussed below) for each timer determines the counting mode to be used. When a timer is serviced, its present count value is incremented and compared to the maximum count for that timer. If the two value match, the count value resets to zero. The timers 102, 104, and 106 can be configured to either stop after a single cycle or run continuously. The timer 0 102 and the timer 1 104 are functionally identical. The timer 0 102 and the timer 1 104 each have a latched, synchronized output shown output from the counter element 110 at 112 and 114, respectively. The output latch 116 has a single output pin shown at 120 and the output latch 118 has an output shown at 122. The output of the timer 0 102, indicated at 120, and the output of the timer 1 104, indicated at 122, can be either a single pulse, indicating the end of a timing cycle, or a variable duty cycle wave. These two output options correspond to single maximum count mode and dual maximum count mode, respectively. Interrupts can be generated at the end of any timing cycle and are communicated to the CPU 108 via the output latch 124. The timer 2 106 has no input or output pins and may only be operated in single maximum count mode. The timer 2 106 can only be clocked internally. The timer 2 106 can also generate an interrupt at the end of any timing cycle which is communicated to the CPU 108 via the output latch 124. The timer 0 102 receives input via the input pin T0 IN 126 via the transition latch/synchronizer 128. The timer 1 104 receives input via the input pin T1 IN 130 via the transition latch/synchronizer 132.

Figure 2:
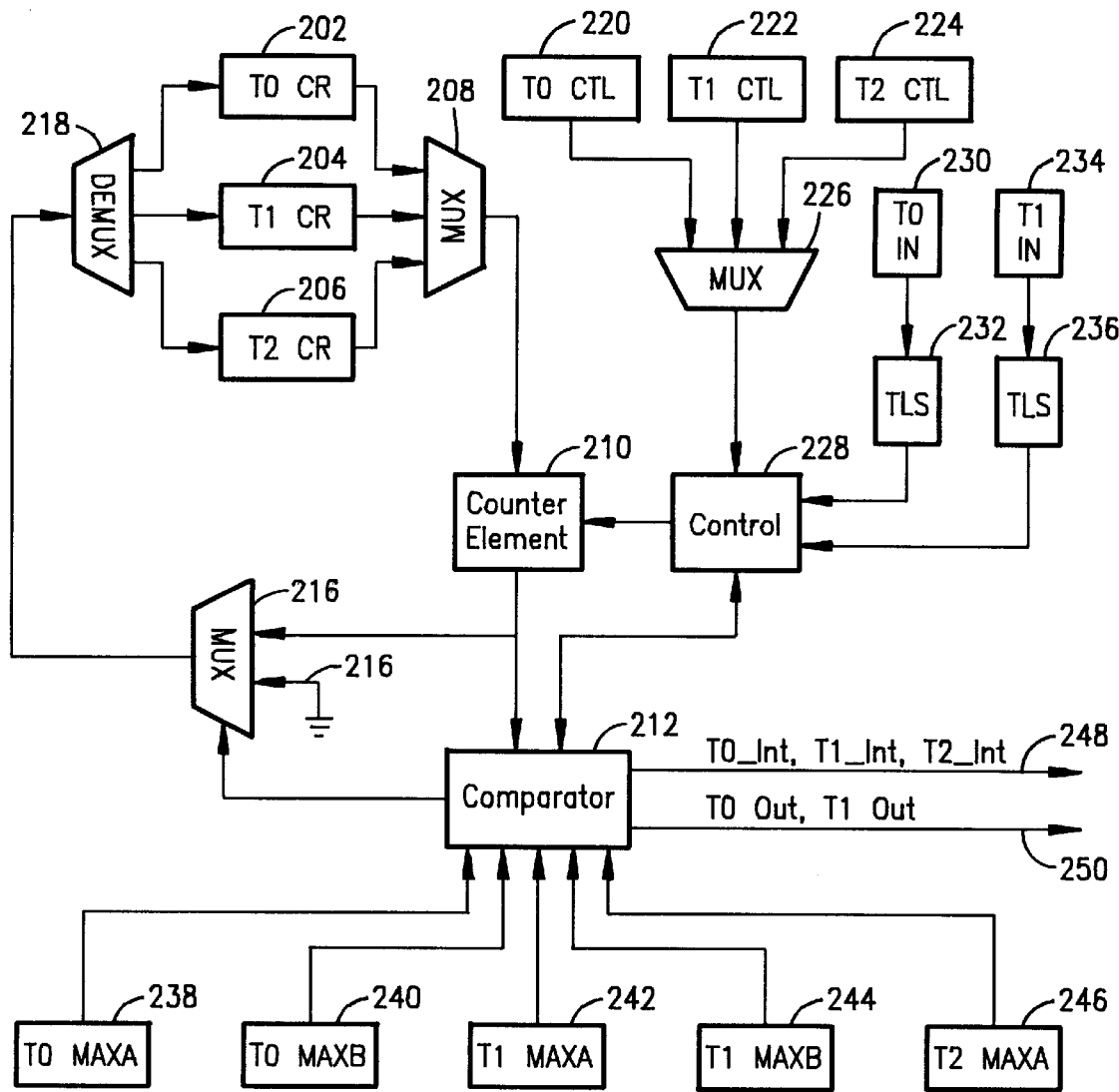
FIG. 2 shows a detailed architecture of a prior art timer counter that is used in the overall architecture shown in FIG. 1.

Referring to FIG. 2, there is shown a prior art detailed architecture of a timer counter 200. The timer counter 200 shows the details of the associated registers indicated at 102, 104 and 106 (FIG. 1). The count register T0 CR 202 is associated with the timer 102 (FIG. 1), the count register T1 CR 204 is associated with the timer 104 (FIG. 1), and the count register T2 CR 206 (FIG. 1) is associated with the timer 106 (FIG. 1). The outputs of the count registers 202, 204, and 206 are multiplexed by the MUX 208 and input into the counter element 210. The output of the counter element 210 is input to the comparator 212 and to the multiplexor MUX 214 which multiplexes the output of the counter element 210 and a low provided by the input 216 which is connected to ground. The output of the MUX 214 is input to the demultiplexor DEMUX 218 which provides an input to one of the count registers 202, 204, or 206. The control register T0 CTL 220 is associated with the timer 102 (FIG. 1), the control register T1 CTL 222 is associated with the timer 104 (FIG. 1), and the control register T2 CTL 224 is associated with the timer 106 (FIG. 1). The outputs of the control registers 220, 222, and 224 are input to the multiplexor MUX 226. The output of the MUX 226 is input to the control 228. Also input into the control 228 are the T0 IN input, indicated at 230, via the TLS (Transition latch/synchronizer) 232 and the T1 IN input, indicated at 234, via the TLS 236. The control 228 has an output to the counter element 210 and to the comparator 212. The comparator 212 has inputs from the timer 0 maxcount register, T0 MAXA 238, the timer 0 maxcount register, T0 MAXB 240, the timer 1 maxcount register, T1 MAXA 242, the timer 1 maxcount register, T1 MAXB 244, and the timer 2 maxcount register, T2 MAXA 246. The comparator 212 has an output to the MUX 214 and outputs 250 T0 OUT or T1 OUT. The comparator 212 also has outputs 248 T0$_{13}$ INT, T1$_{13}$ INT, or T2$_{13}$ INT.

Figure 3:
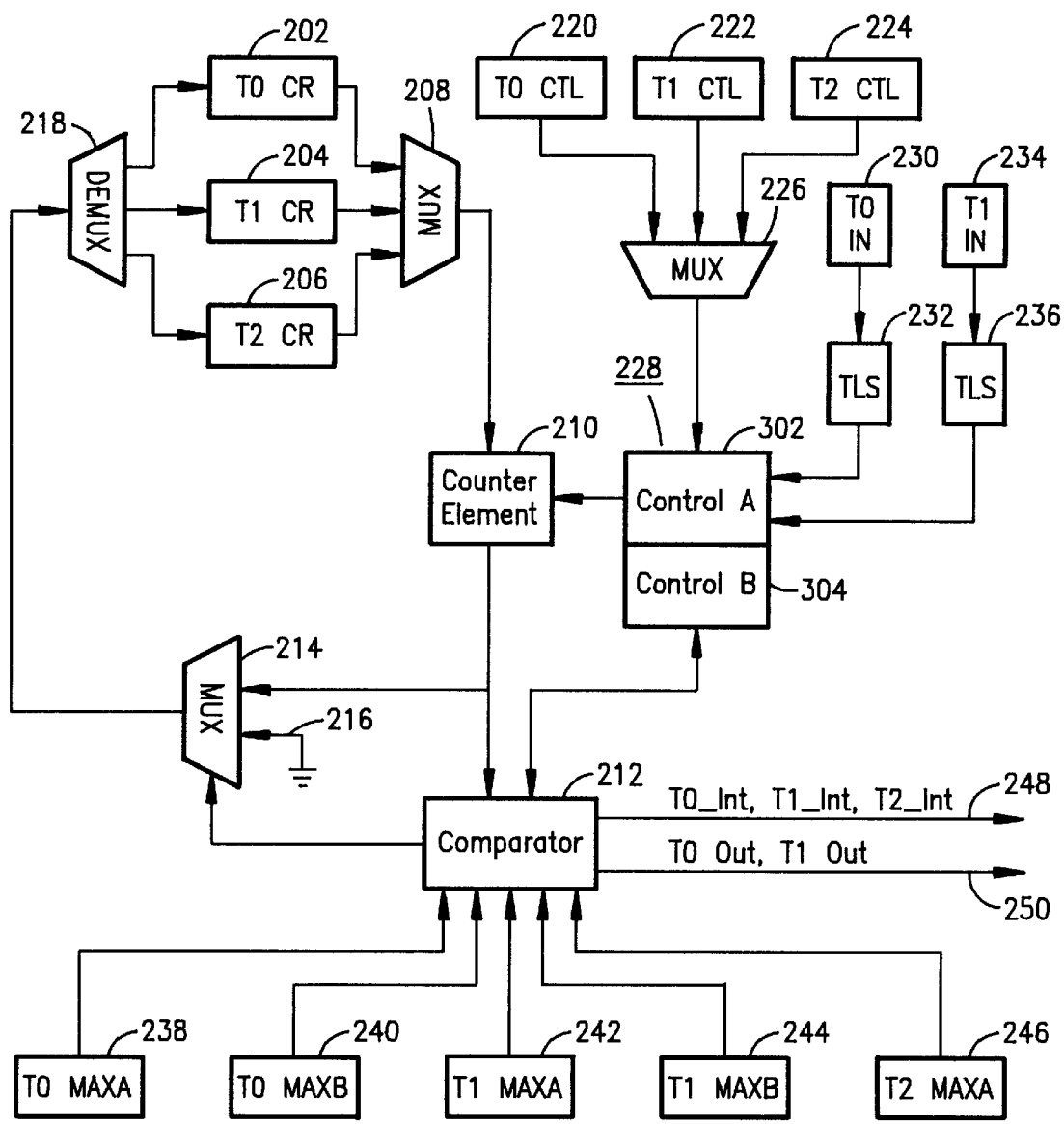
FIG. 3 shows a detailed architecture of a timer counter of the present invention that is used in the overall architecture shown in FIG. 1.

Referring to FIG. 3, there is shown a detailed architecture of an embodiment of a timer counter 300 of the present invention. Like numeral designations denote like elements as shown in FIG. 2. The timer counter 300 shows the details of the associated registers indicated at 102, 104 and 106 (FIG. 1) as used in the present invention. In the present invention the control 228 is divided into two sections, control A 302 and control B 304. The output of the MUX 226 is input to the control 228. Also input into the control 302 are the T0 IN input, indicated at 230, via the TLS (Transition latch/synchronizer) 232 and the T1 IN input, indicated at 234, via the TLS 236. Control A 302 provides an output to the counter element 210 and control B 304 provides an output to the comparator 212.

Figure 4:
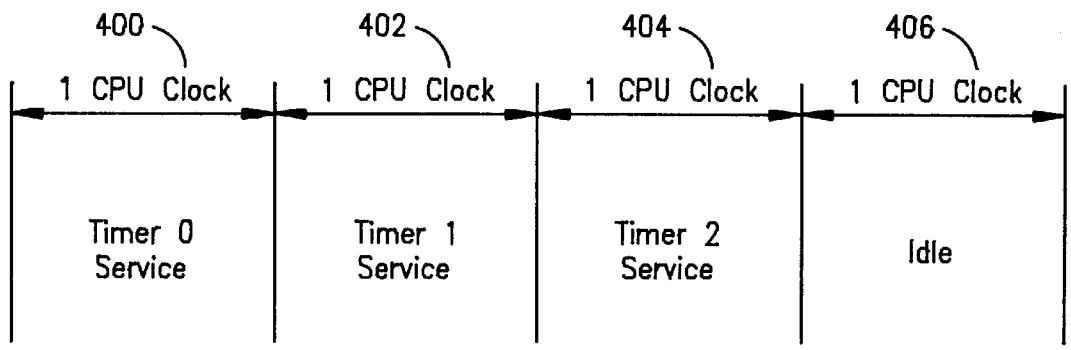
FIG. 4 shows a timing diagram of the prior art timer counter servicing sequence.
Figure 5:
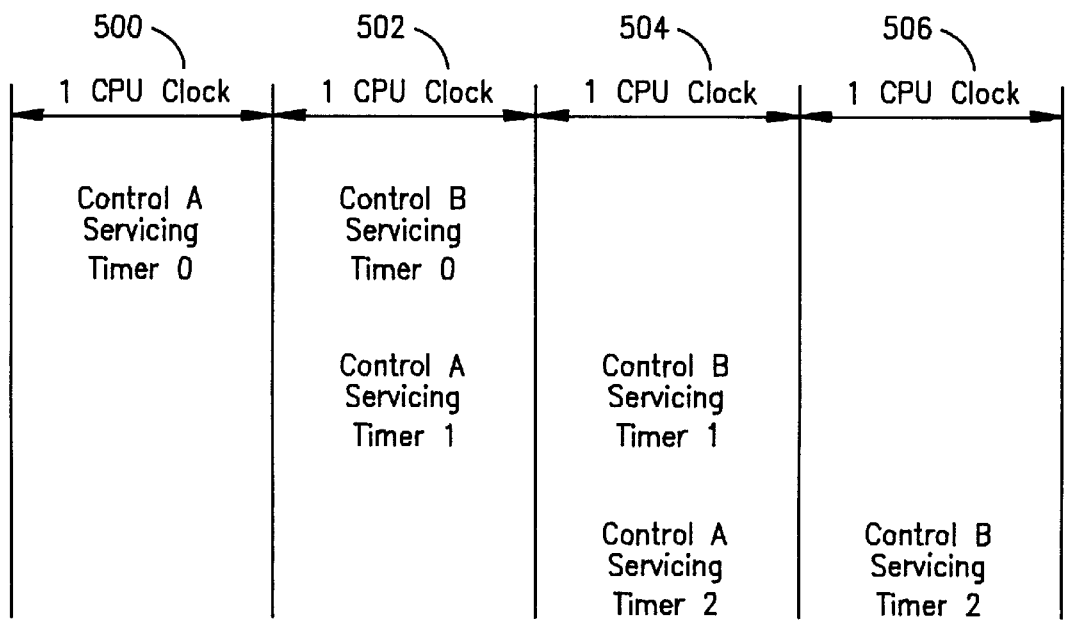
FIG. 5 shows a timing diagram of the timer counter servicing sequence of the present invention.
Figure 6:
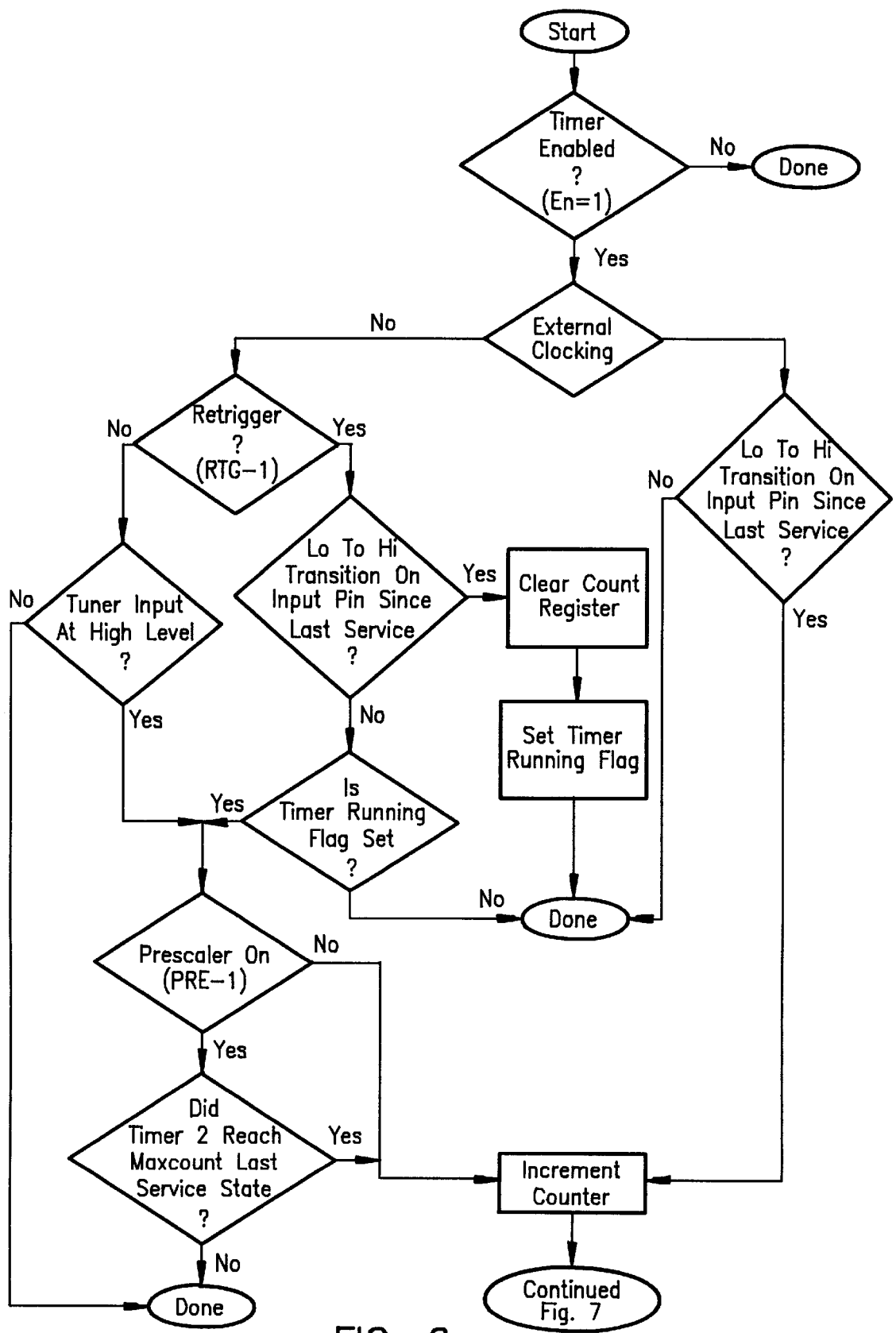
FIG. 6 shows the first portion of the timer 0 and timer 1 servicing flow chart.
Figure 7:
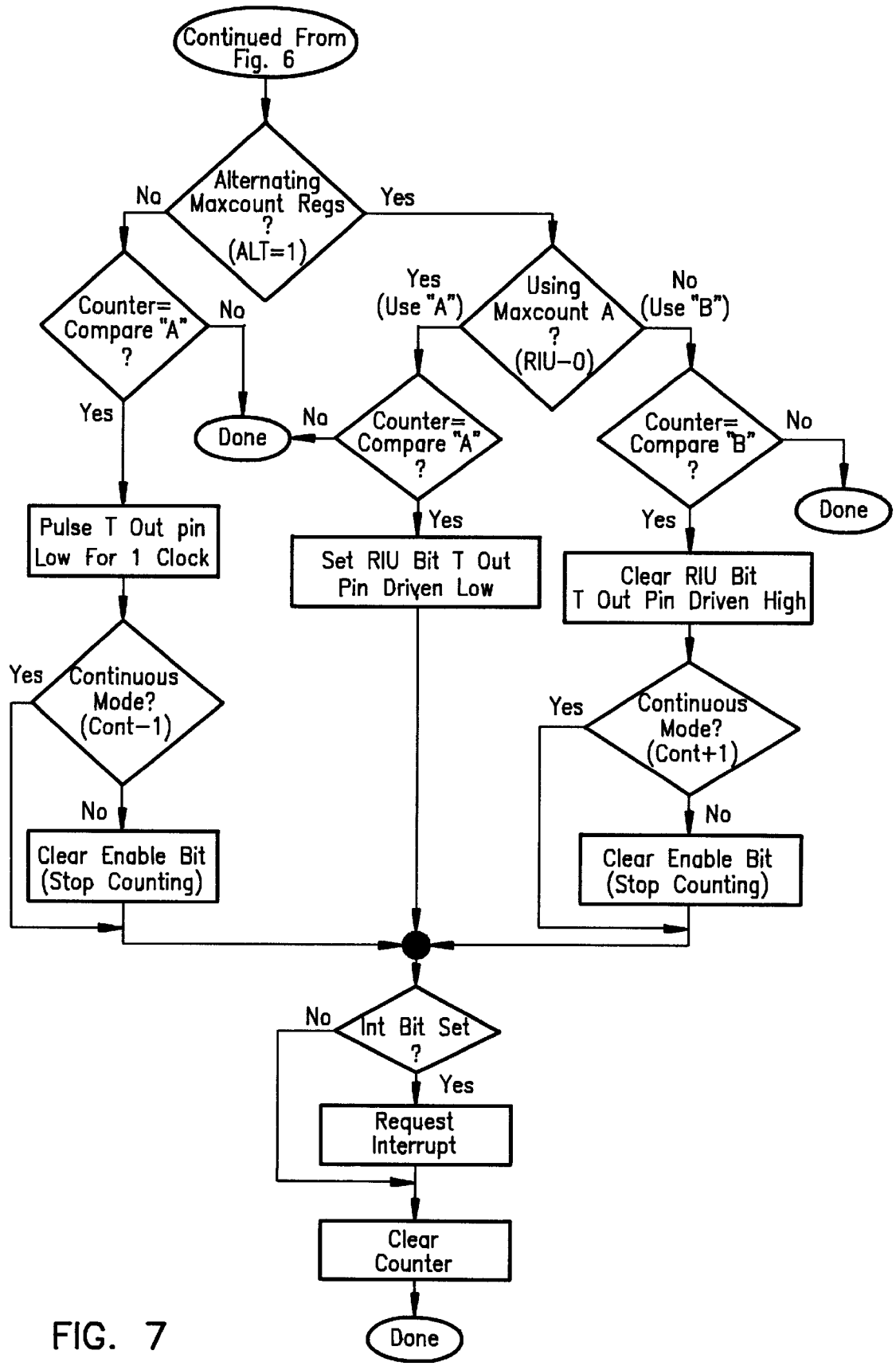
FIG. 7 shows the second portion of the timer 0 and timer 1 servicing flow chart.

Referring to FIGS. 4 and 5, the pipelining of the timer servicing of the present invention is compared to the timer servicing of the prior art. FIG. 4 shows the timing sequence for the prior art. In the first CPU clock, indicated at 400, timer 0 must be completely serviced. FIGS. 6 and 7 illustrate the flow chart of the timer servicing sequence that must be accomplished in the first CPU clock 400 for timer 0. Similarly, in the second CPU clock, indicated at 402, timer 1 must be completely serviced according to the flow chart in FIGS. 6 and 7. In the third CPU clock, indicated at 404, the timer 2 is serviced. The service of timer 2 is much simpler than the service of timer 0 and timer 1 because timer 2 has no input or output pins and may only be operated in single maximum count mode. In addition, timer 2 can be used as a free-running clock and a prescaler to timers 0 and 1. Timer 2 can only be clocked internally, at ¼ CLKOUT frequency. Timer 2 can also generate interrupts at the end of any timing cycle.

FIG. 5 shows the pipeline function. The pipeline function is provided by the control A 302 and the control B 304. Control A 302 services the timer 0 and the timer 1 in a pipeline method with the operations contained in the flow chart shown in FIG. 6 as follows. In the first CPU clock, indicated at 500, control A 302 services timer 0 with the operations shown in FIG. 6. In the second CPU clock, indicated at 502, control A 302 services timer 1 with the operations shown in FIG. 6 while control B 304 completes the servicing of timer 0 with the operations shown in FIG. 7. In the third CPU clock, indicated at 504, control A 302 services timer 2 and control B 304 completes the servicing of timer 1. In the fourth CPU clock, indicated at 506, control B 304 completes the servicing of timer 2.

The timer counter 300 is controlled as follows. Each timer has three registers. For example, timer 0 102 (FIG. 1) has the timer control register 220, the timer count register 202, and a timer maxcount register T0 MAXA 238. The timer 0 102 and timer 1 104 also have access to an additional maxcount register T0 MAXB 240 and T1 MAXB 244. The timer control registers, 220, 222, and 224 control timer operation. Each of the timer count registers 202, 204, and 206 holds the current timer count value and the maxcount registers 238, 240, 242, 244, and 246 holds the maximum timer count value. The timer count registers 202, 204, and 206 may increment once for each timer event. For internal clocking, the timer may increment every fourth CPU clock due to the counter element's time-multiplexed servicing scheme. The timer 2 may only use the internal clock as a timer event. The timer 0 102 and the timer 1 104 can also use the timer 2 106 reaching its maximum count as a timer event. In this configuration, the timer 0 102 or the timer 1 104 increments each time the timer 2 106 reaches its maximum count. Table 1 shows the function of the timer 0 and timer 1 control registers.

TABLE 1

Register Name: Timer 0 and 1 Control Registers
Register Mnemonic: T0CON, T1CON
Register Function: Defines Timer 0 and 1 operation.

| Bit number: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | EN | INH | INT | RIU | | | | | | | MC | RTG | P | EXT | ALT | CONT |

| BIT MNEMONIC | BIT NAME | RESET STATE | FUNCTION |
|---|---|---|---|
| EN | Enable | 0 | If set, the timer is enabled. This bit cannot be written to unless the INH bit is set. |
| INH | Inhibit | X | If set, writes to the Enable bit are allowed. If clear, writes to the Enable are ignored. This bit is not stored and is always read as zero. |
| INT | Interrupt | X | If set, an interrupt request is generated when the Count register equals a maximum. If clear, the timer will not issue interrupt requests. |
| RIU | Register in Use | X | If set, Maxcount Compare register B is being used. If clear, Maxcount Compare register A is being used. |
| MC | Maximum Count | X | If set, counter has reached a maximum count. If clear, counter has not reached a maximum count. |
| RTG | Retrigger | X | If set, 0 to 1 edge on TxIN resets count. If clear, high input enables counting. This bit is ignored with external clocking (EXT = 1). |
| P | Prescaler | X | If set, timer is prescaled by Timer 2. If clear, timer counts 1/4 CLKOUT. This bit is ignored with external clocking (EXT = 1). |
| EXT | External Clock | X | If set, use external clock. If clear, use internal clock. |
| ALT | Alternate Compare Register | X | If set, count to Maxcount Compare A, reset Count register to zero, count to Maxcount Compare B, reset Count register to zero again. If clear, count to Maxcount Compare A and reset Count register to zero. |
| CONT | Continuous mode | X | If set, timer runs continuously. If clear EN is cleared after each timer counting sequence. |

Note: Register bits 6–11 are reserved and must be written to a logic zero.

TABLE 2

Register Name: Timer 2 Control Register
Register Mnemonic: T2CON
Register Function: Defines Timer 2 operation

| Bit number: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | EN | INH | INT | | | | | | | | MC | | | | | CONT |

| BIT MNEMONIC | BIT NAME | RESET STATE | FUNCTION |
|---|---|---|---|
| EN | Enable | 0 | If set, the timer is enabled. If clear, the timer is disabled. This bit cannot be written to unless the INH bit is set. |
| INH | Inhibit | X | If set, writes to the Enable bit are allowed. If clear, writes to the Enable bit are ignored. This bit is not stored and is always read as zero. |
| INT | Interrupt | X | If set, an interrupt request is generated when the Count register equals a maximum count. If clear, the timer will not issue interrupt requests. |
| MC | Maximum Count | X | If set, counter has reached a maximum count. If clear, counter has not reached a maximum count. This bit must be cleared by the user after maximum count is reached. |
| CONT | Continuous Mode | X | If set, timer runs continuously. If clear, EN is cleared after each timer counting sequence. |

Note: Bits 1–4 and 6–12 are reserved and must be written to a logic zero.

Table 2 shows the funciton of the timer 2 control register.

The counting sequence of the timers are controlled by the associated timer control register and the associated maxcount A register. In addition, as noted above, the timer 0 102 and the timer 1 104 have access to a second maxcount register B. Whenever the contents of the timer count register equal the contents of the maxcount register, the count register resets to zero. This is because the counter element increments, compares and resets a timer in one clock cycle. Therefore, the maximum value is never written back to the count register. The maxcount register may be written to any time during timer operation. The timer counting from its initial count (usually zero) to its maximum count (either Maxcount register A or B) and resetting to zero defines one timing cycle. Only equivalence between the timer count and the maxcount registers is checked. The count does not reset to zero if its value is greater than the maximum count. If the count value exceeds the maxcount register value, the timer counts to its maximum value and increments to zero, then counts to the value in the maxcount register.

The control A 302 and the control B 304 in the control 228 control the servicing sequence of the timer counters 102, 104, and 106. Control B 304 outputs a control signal to the comparator 212 which resets the count registers 202, 204, and 206 when required via the MUX 214. In addition, the comparator 212 may generate an interrupt on outputs 248 or an output on outputs 250.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What I claim is:

1. A pipelined counter timer for a computer system, comprising:

multiple timers each having an associated counter register and an output;

a first multiplexor for multiplexing the outputs from the multiple timers and associated counter registers;

a counter element receiving the multiplexed output from the first multiplexor;

multiple timer control registers each having an output;

a second multiplexor for multiplexing the outputs from the timer control registers;

first and second controls for receiving the multiplexed output from the second multiplexor, wherein the first and second controls provide first and second servicing sequences and wherein the first control has an output to the counter element;

a third multiplexor for multiplexing an output from the counter element and a ground signal;

a comparator receiving inputs from the counter element and from the second control and an output to the third multiplexor; and a demultiplexor for demultiplexing an output from the third multiplexor and for providing demultiplexed signals to the multiple timers and associated counter registers.

2. The pipelined counter timer of claim 1 further comprising:

a first timer IN having an input to the first control via a transition latch/synchronizer; and a second timer IN having an input to the first control via a transition latch/synchronizer.

3. The pipelined counter timer of claim 2 further comprising multiple maxcount registers each having an output to the comparator.

4. A method of pipeline servicing multiple timers in a timer counter for a computer system, the method comprising:

multiplexing outputs from multiple timers and associated counter registers;

inputting the multiplexed outputs from the multiple timers and associated counter registers into a counter element;

multiplexing outputs from multiple timer control registers;

generating first and second servicing sequences in first and second controls which receive the multiplexed outputs from the multiple timer control registers;

inputting the first and second servicing sequences to the counter element;

inputting the first and second servicing sequences to the multiple timers and associated counter registers; and inputting a signal from the second control to a comparator.

5. The method of claim 4 wherein the step of inputting the first and second servicing sequences to the multiple timers and associated counter registers is accomplished by inputting the first and second servicing sequences to the multiple timers and associated counter registers via a multiplexor and demultiplexor, wherein the first and second servicing sequences are multiplexed with a ground signal, and wherein the multiplexed output is controlled by an input from the comparator.

* * * * *